United States Patent
Nakano et al.

(10) Patent No.: US 7,595,121 B2
(45) Date of Patent: Sep. 29, 2009

(54) PROTON CONDUCTIVE POLYMER, CATALYST COMPOSITE, ELECTROLYTE MEMBRANE FOR FUEL CELL AND FUEL CELL

(75) Inventors: Yoshihiko Nakano, Kanagawa-ken (JP); Hideo Oota, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/924,868

(22) Filed: Aug. 25, 2004

(65) Prior Publication Data
US 2005/0089741 A1    Apr. 28, 2005

(30) Foreign Application Priority Data
Aug. 28, 2003   (JP)   ............... 2003-304017

(51) Int. Cl.
*H01M 8/00* (2006.01)
*H01M 4/00* (2006.01)
*H01M 8/10* (2006.01)
*H01M 8/08* (2006.01)

(52) U.S. Cl. ............... 429/12; 429/46; 429/33; 429/29

(58) Field of Classification Search ............... 429/12, 429/33, 46, 29
See application file for complete search history.

(56) References Cited

U.S. PATENT DOCUMENTS

| 5,151,515 A | * | 9/1992 | Cisar ............... 546/12 |
| 5,525,436 A | * | 6/1996 | Savinell et al. ............... 429/30 |
| 6,288,187 B1 | * | 9/2001 | Armand ............... 526/240 |
| 6,319,293 B1 | * | 11/2001 | Debe et al. ............... 29/623.3 |
| 2004/0106030 A1 | * | 6/2004 | Wixom et al. ............... 429/33 |

FOREIGN PATENT DOCUMENTS

| JP | 9-73908 | 3/1997 |
| JP | 2000-195528 | 7/2000 |
| JP | 2003-132908 | 5/2003 |
| JP | 2005-50628 | 2/2005 |

OTHER PUBLICATIONS

Amiko Kamaya, et al., Polymer Preprints, Japan, vol. 51, No. 4, 2002, (1 page).

* cited by examiner

*Primary Examiner*—Patrick Ryan
*Assistant Examiner*—Helen O Chu
(74) *Attorney, Agent, or Firm*—Oblon, Spivak, McClelland, Maier & Neustadt, P.C.

(57) ABSTRACT

The present invention is to provide an electrolyte membrane for fuel cell of low fuel permeability and high proton conductivity and to provide a fuel cell comprising the electrolyte membrane.

According to the present invention, a polymer membrane including repeating unit of five-membered heterocyclic rings is used as an electrolyte membrane of the fuel cell. The electrolyte membrane has high proton conductivity with free from moves of the fuel or water when the proton conducts in the electrolyte membrane.

19 Claims, 4 Drawing Sheets

PROTON CONDUCTIVE POLYMER, CATALYST COMPOSITE, ELECTROLYTE MEMBRANE FOR FUEL CELL AND FUEL CELL

CROSS-REFERENCE TO RELATED APPLICATIONS

This application is based upon and claims the benefit of priority from the prior Japanese paten Applications No. JP2003-304017, filed on Aug. 28, 2003; the entire contents of which are incorporated herein by reference.

BACKGROUND OF THE INVENTION

1. Field of the Invention

The present invention relates to a proton conductive polymer, a catalyst composite, an electrolyte membrane for a fuel cell, and a fuel cell.

2. Related Art

It is in public that the proton conductive polymer is useful as a functional polymer, since it could be used as an ion exchange resin or a solid acid catalyst. Recently, researches are being commonly made that an electrolyte membrane comprising the proton conductive polymer could be applied to a fuel cell.

The fuel cell is a system for directly transforming chemical energy of fuel into electrical energy by electrochemically oxidizing a fuel e.g. hydrogen or methanol in the fuel cell and outputting the latter energy. The system is now drawing an attention in view of a clean electrical energy source, because the system outputs no NOx nor SOx, which are output by conventional power plants combusting fossil fuels. Especially, the proton conductive polymer fuel cell can operate with very high efficiency, because the fuel cell is free from thermodynamic restrictions of Carnot cycle. The theoretical efficiency of the proton conductive polymer fuel cell reaches as much as 83% at 25 degree.

Polymer bearing a sulfonic acid group is known as the proton conductive polymer being used with the proton conductive polymer fuel cell. One of representative examples of the sulfonic acid group containing polymer is "Nafion" (registered trademark) developed by and commercially available from Du Pont Inc or equivalents thereof "Nafion" (registered trademark) includes a copolymer of tetrafluoroethylene and perfluorovinylether as a base and the sulfonic acid group as an ion exchange group. The polymer is a chemically stable compound.

For manufacturing the fuel cell, an electrode complex (membrane electrode assembly (MEA)) is formed by processes of that "Nafion" (registered trademark) is held between an anode and a cathode and further the assembly is hot-compression bonded by hot pressing. When it comes to power generation of the fuel cell, fuel are supplied to an anode end of MEA-, while oxidizing agents (e.g. air or $O_2$) are supplied to the cathode end thereof. The proton and the electron are electrochemically produced at the anode end. The electron produced flows through an external circuit. On the other hand, the proton reaches the cathode end through "Nafion"(registered trademark), where the proton and the electron terminating from the external circuit react with each other via the oxidizing agent and leads to water production. As results, the electrical power is generated.

A certain problem will, however, occur, in case of that "Nafion" (registered trademark) or the equivalents thereof is used with the direct methanol fuel cell. Specifically, the methanol having permeated through the anode disperses in "Nafion" (registered trademark), and reaches the cathode, where directly reacts with the oxidizing agent on the cathode catalyst, this phenomenon is referred to "cross-over", resulting in very low fuel cell performance.

Laid-open patent Hei9-73908 and Laid-open patent 2000-195528 disclose a composite membrane which includes strong acid immersed in polybenzimidazole as the proton conductive polymer other than "Nafion"(registered trademark). In addition to that, Polymer Preprints, Vol. 51, No. 4, P 749 IPg 141 discloses a composite membrane including poly(1,2,4-triazole) and phosphoric acid. The entire contents of which are incorporated herein by reference.

These composite membranes mentioned above have imidazole or (1,2,4-triazole) in its main chain skeleton, which retains the strong acid. This leads to exhibiting proton conductivity. The polymer contained in the membranes has, however, rigid skeleton. The proton of the strong acid retained in the skeleton is believed to be poorly conductive, because of its low mobility.

BRIEF SUMMARY OF THE INVENTION

The present invention has been achieved in view of situation described above. According to this invention, the proton conductive polymer having low-methanol permeability and high-proton conductivity, especially, applicable to the electrolyte membrane for the fuel cell, a catalyst composite comprising the proton conductive polymer, an electrolyte membrane comprising the proton conductive polymer and a fuel cell comprising the electrolyte membrane is provided.

The invention is intended to provided a proton conductive polymer comprising a polymer including at least one repeating unit selected from the following general chemical formulas 1 to 5.

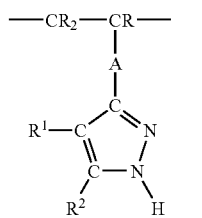

1

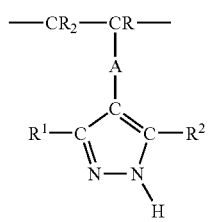

2

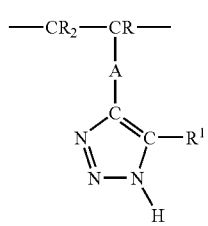

3

-continued

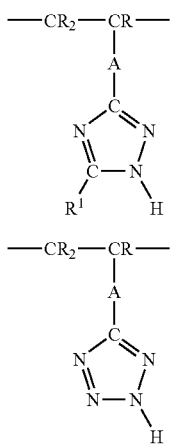

(wherein A is a valence or a bivalent organic group, R is at least one selected from the group consisting of hydrogen atom, halogen atom, or substituted or unsubstituted hydrocarbon group. $R^1$ is at least one selected from the group consisting of hydrogen atom, halogen atom, substituted or unsubstituted amino group, substituted or unsubstituted alkoxy group, and substituted or unsubstituted hydrocarbon group, $RR^2$ are at least one selected from the group consisting of hydrogen atom, halogen atom, substituted or unsubstituted amino group, substituted or unsubstituted alkoxy group, and substituted or unsubstituted hydrocarbon group.)

R, $R^1$, $R^2$ are whether identical or not.

According to one aspect of the invention, there is provided a proton conductive polymer comprising a polymer obtained by polymerizing at least one monomer compound general chemical formulas (1) to (5) as follows.

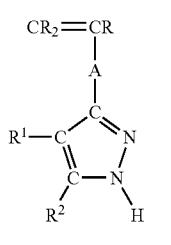

(1)

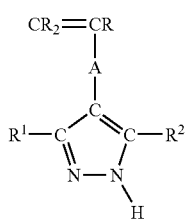

(2)

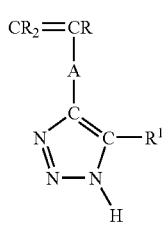

(3)

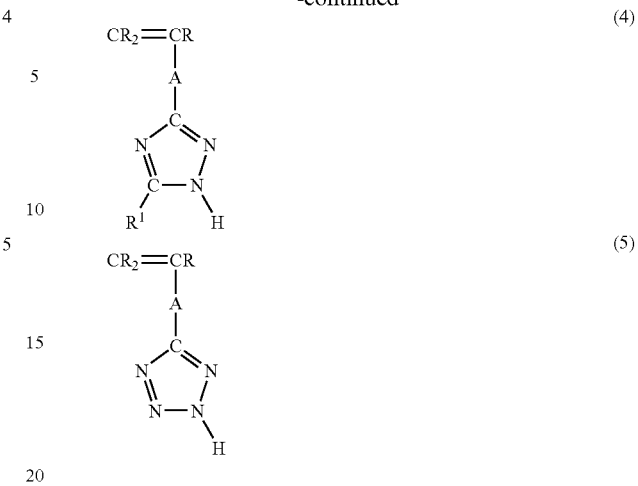

(wherein A is a valence or a bivalent organic group, R is at least one selected from the group consisting of hydrogen atom, halogen atom, or substituted or unsubstituted hydrocarbon group. $R^1$ is at least one selected from the group consisting of hydrogen atom, halogen atom, substituted or unsubstituted amino group, substituted or unsubstituted alkoxy group, and substituted or unsubstituted hydrocarbon group, $R^2$ are at least one selected from the group consisting of hydrogen atom, halogen atom, substituted or unsubstituted amino group, substituted or unsubstituted alkoxy group, and substituted or unsubstituted hydrocarbon group.)

R, $R^1$, $R^2$ are whether identical or not.

According to another aspect of the invention, there is provided an electrolyte membrane for the fuel cell, comprising the proton conductive polymer.

According to another aspect of the invention, there is provided an electrolyte membrane for the fuel cell, comprising a composite comprising the proton conductive polymer and an acid.

According to another aspect of the invention, there is provided a catalyst composite comprising a catalyst, and the proton conductive polymer or a composite comprising the proton conductive polymer and an acid.

According to another aspect of the invention, there is provided a fuel cell comprising an anode, a cathode and the electrolyte membrane held between the anode and the cathode.

Further, according to another aspect of the invention, there is provided a fuel cell comprising an anode, a cathode and an electrolyte membrane held between the anode and the cathode, wherein at least one of the anode and the cathode includes the catalyst composite, and the catalyst of the catalyst composite promotes the electrode reaction.

BRIEF DESCRIPTION OF THE SEVWRAL VIEWS OF THE DRAWINGS

Figure 3:
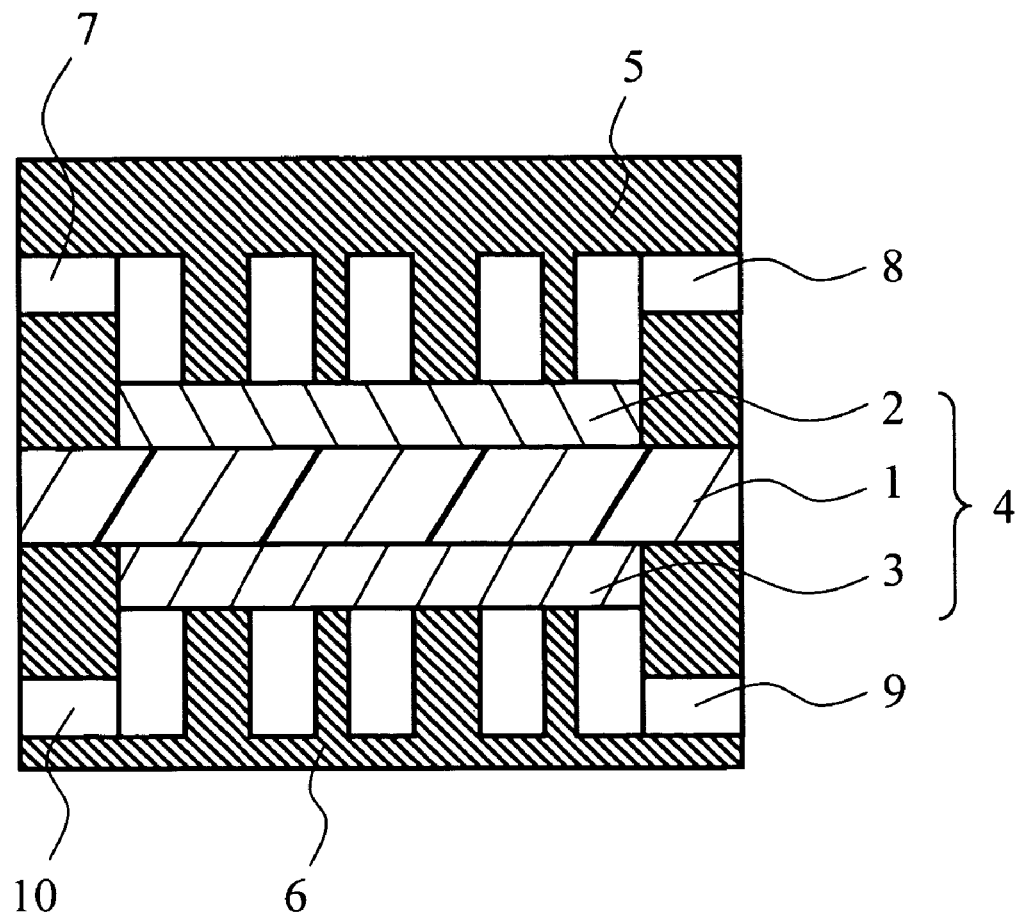
Figure 4:
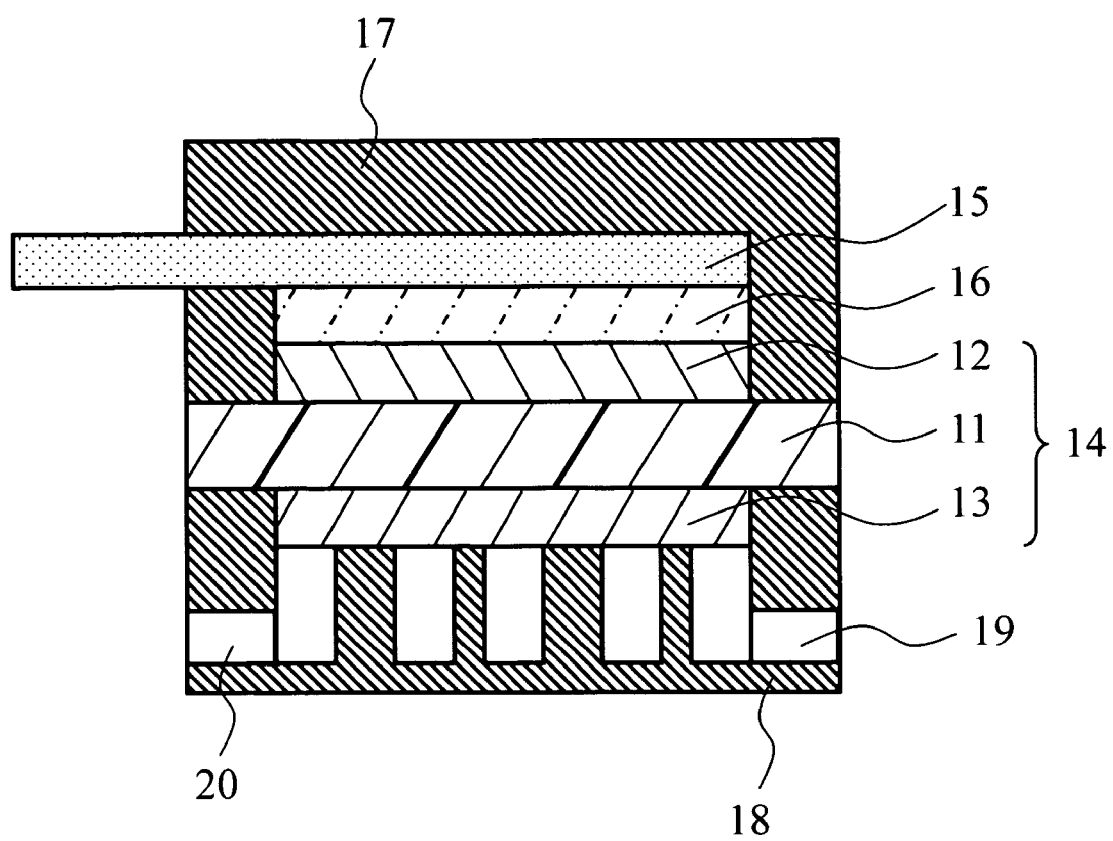

FIG. 3 schematically shows the fuel cell according to one embodiment of the present invention; and FIG. 4 schematically shows the fuel cell according to one embodiment of the present invention.

DETAILED DESCRIPTION OF THE INVENTION

Figure 1:
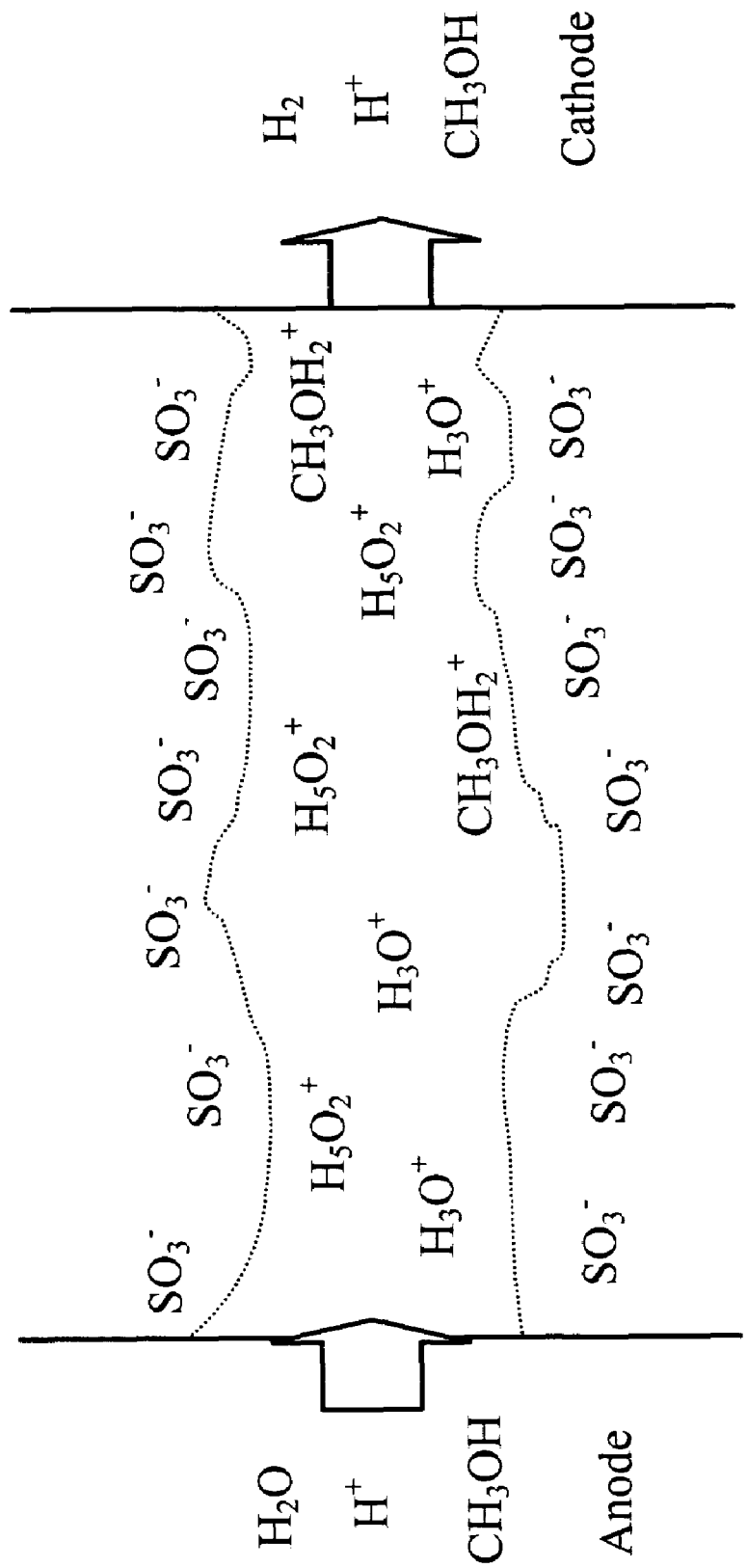
FIG. 1 shows a schematic view explaining the proton conductivity of the polymer membrane having sulfonic acid group.
Figure 2:
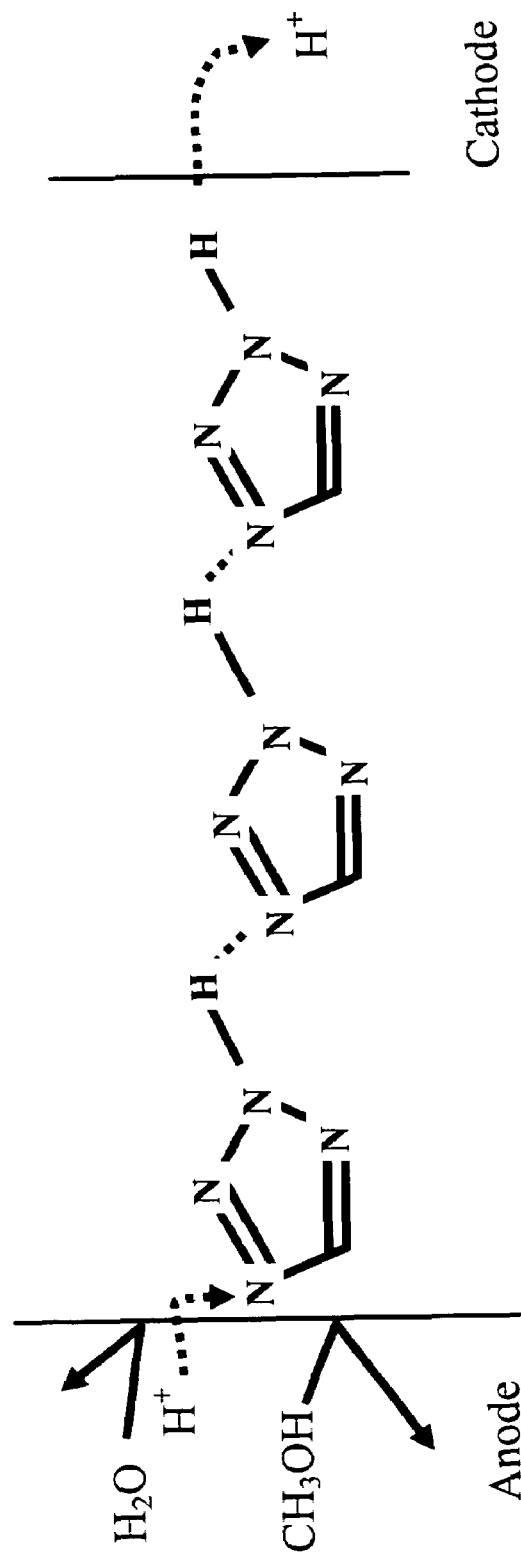
FIG. 2 shows a schematic view explaining the proton conductivity of the polymer membrane having five-membered heterocyclic rings.

FIG. 1 shows a schematic view explaining the proton conductivity of the polymer membrane having sulfonic acid group. FIG. 2 shows a schematic view explaining the proton conductivity of the polymer membrane having five-membered heterocyclic rings.

The proton conductivity of proton conductive membrane having conventional sulfonic acid group e.g. "Nafion" (registered trademark) could be explained using a mechanism as described hereinafter. Referring to FIG. 1, according to the mechanism, the hydrogen ion ($H_3O^+$) moves along a network comprising the sulfonic acid group and waters (including both binding water and free water) adjacent thereto retained in the membrane. The mechanism is referred to "Vehicle" mechanism. When the hydrogen ion ($H_3O^+$) moves in the membrane, the hydrogen ion is believed to moves, while hydrating with 2-3 water molecules.

In the fuel cell using the proton conductive membrane as the electrolyte membrane, big volume of water located at the anode end move to the cathode end, together with the hydrogen ion moving from the anode to the cathode, The phenomenon prevents oxygen at the cathode end from reducing reaction and the anode end is short of water. As a result, for the fuel cell to be kept operating, a system is needed for providing the anode end with big volume of water and removing rapidly water from the cathode end. Furthermore, according to the "Vehicle" mechanism, when a fuel e.g. methanol, being capable of solvating the proton like a water molecule is used, the fuel permeates from the anode to the cathode just like water. This leads to a markedly low fuel cell performance.

By contrast, in case of that the proton conductive polymer containing at least one of repeating unit among repeating units as set forth in chemical formulas 1 to 5 is used as the electrolyte membrane material, the proton is believed to move or conduct, according to "Grotthuss" mechanism or Popping mechanism that the proton moves or conducts from nitrogen of a five-membered heterocyclic rings to nitrogen of other five-membered heterocyclic rings, as shown in FIG. 2. The "Gotthouss" mechanism as shown in FIG. 2, differing from the "Vechicle" mechanism of FIG. 1, can make the fuel cell system miniaturized, because the former mechanism needs no hydrating molecules to let the proton move or conduct and therefore the water does not move from the anode to the cathode due to the proton conducting. This leads to a simple water management of the fuel cell. The methanol is not believed to move or permeate during proton conducting, as the water does not move.

Furthermore, the electrolyte membrane including proton conductive polymer makes the proton conduct smoothly.

Therefore, the electrolyte membrane having the proton conductive polymer is believed to be highly proton conductive and poorly methanol permeable. As a result, the direct methanol fuel cell comprising polymer solid electrolyte membrane shows high fuel cell performance, because of small degree of crossover of methanol. Furthermore, it is very preferable in the industry to be able to manufacture the electrolyte membrane with low cost, because of less expensive proton conductive polymer. The electrolyte membrane including the proton conductive polymer doe not tend to deteriorate during fuel cell operation.

Now the present invention will be described more in detail hereinafter with references to embodiments of the electrolyte membrane and a fuel cell comprising them.

The electrolyte membrane will be described, containing at least one of the repeating unit among the repeating units as set forth in chemical formulas 1 to 5.

In the chemical formulas 1 to 5, A is a valence (directly coupling of a vinyl group with five-membered heterocyclic rings) or a bivalent organic group.

In case of that A is a bivalent organic group, more specifically, A is methylene, ethylene, trimethylene, propylene, hexamethylene, phenylene, amido bond (—CONH—), ester bond (—COO—), sulfonamide bond (—$SO_2$NH—), amino bond (—NH—). But this description should not be construed as limited to the embodiments set forth herein.

R is hydrogen atom, halogen atom, or substituted or unsubstituted hydrocarbon radicals. $R^1$, $R^2$ are hydrogen atom, halogen atom, substituted or unsubstituted amino groups, substituted or unsubstituted alkoxy groups, or substituted or unsubstituted hydrocarbon radicals. R, $R^1$, $R^2$ are whether identical or not. Two of A, $R^1$, $R^2$ may have fused rings of structures.

The substituted or unsubstituted hydrocarbon radical of R, $R^1$, $R^2$ includes e.g. alkyl group or aromatic group. The alkyl group or the aromatic group includes e.g. methyl group, ethyl group, trifluoromethyl group, phenyl group, 3-mercaptopropyl group, or propyl group. But this description should not be construed as limited to the embodiments set forth herein.

The substituted or unsubstituted amino groups of $R^1$, $R^2$ include e.g. amino group, methylamino group, dimethylamino group, anilino group, hydroxyamino group, acetylamino group, benzoylamino group, or methanesulfonylamino group. But this description should not be construed as limited to the embodiments set forth herein.

The alkoxy group of $R^1$, $R^2$ include e.g. methoxy group, ethoxy group, or isopropoxy group. But this description should not be construed as limited to the embodiments set forth herein.

The weight-average molecular weight of the proton conductive polymer preferably ranges from 500 to 10000000.

The proton conductive polymer may preferably comprises only repeating units as set forth in chemical formulas 1 to 5, alternatively, may comprises other repeating units, if necessary. It is more preferable, to enjoy the advantageous effect of the invention, for the polymer to contain at least one repeating unit among the repeating units as set forth in chemical formulas 1 to 5 and wherein the volume rate of selected repeating units among the polymer molecules ranges from 10 mol % to 100 mol %. Even more preferably, the volume rate ranges from 50 mol % to 100 mol %.

The proton conductive polymer may be a copolymer comprising at least one of vinyl monomers corresponding to the repeating units as set forth in chemical formulas 1 to 5. The copolymer may be made by polymerizing the vinyl monomers corresponding to the repeating units as set forth in chemical formulas 1 to 5. Alternatively, the copolymer may be made by adding one or more other vinyl monomers to the vinyl monomer corresponding to the repeating unit as set forth in chemical formulas 1 to 5 and copolymerizing them.

The vinyl monomer corresponding to chemical formulas 1 to 5 may be these as set forth in following chemical formulas (1) to (5).

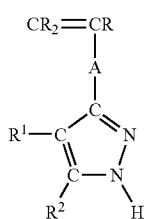 (1)

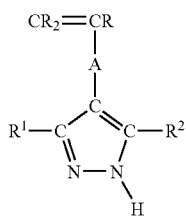 (2)

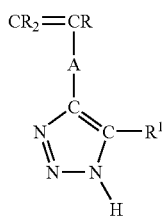 (3)

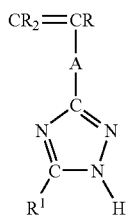 (4)

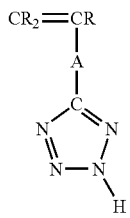 (5)

(wherein, A is a valence or a bivalent organic group. R is hydrogen atom, halogen atom, or substituted or unsubstituted hydrocarbon radicals. $R^1$, $R^2$ are hydrogen atom, halogen atom, substituted or unsubstituted amino groups, substituted or unsubstituted alkoxy groups, or substituted or unsubstituted hydrocarbon radicals. R, $R^1$, $R^2$ are whether identical or not.)

Following chemical formulas are embodiments of the vinyl monomer as set forth in chemical formulas (1) to (5), but this description should not be construed as limited to the embodiments set forth herein.

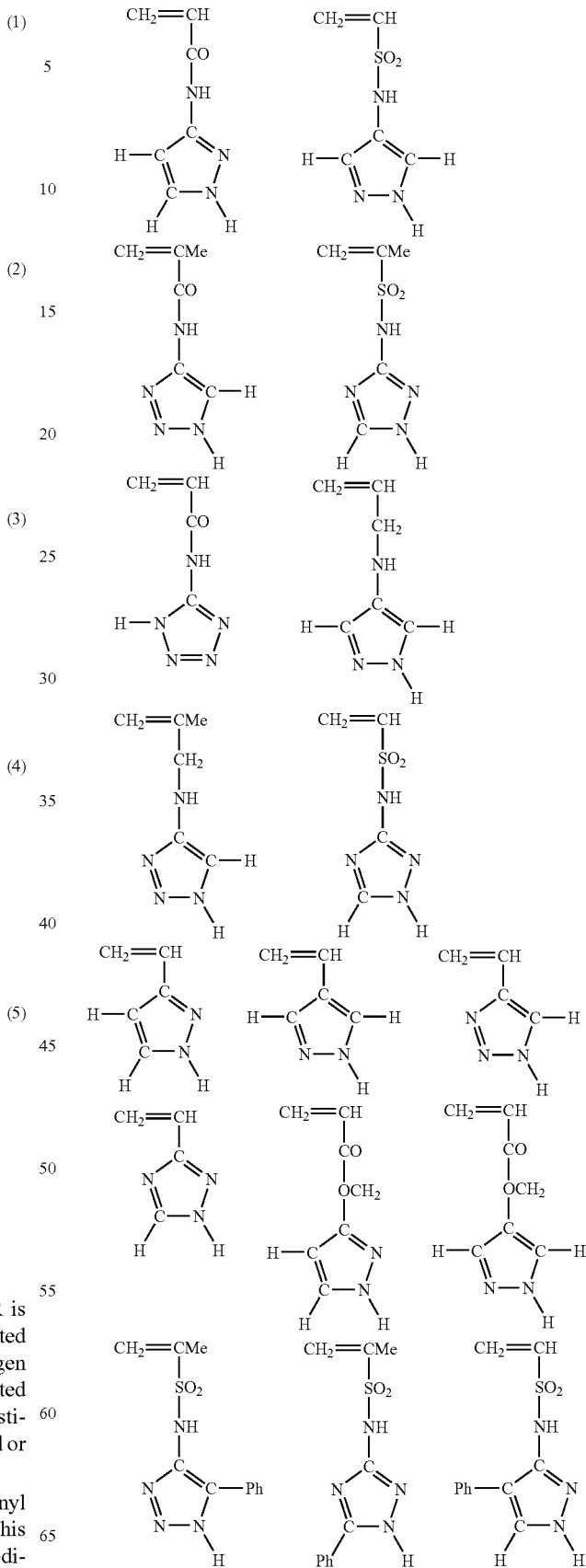

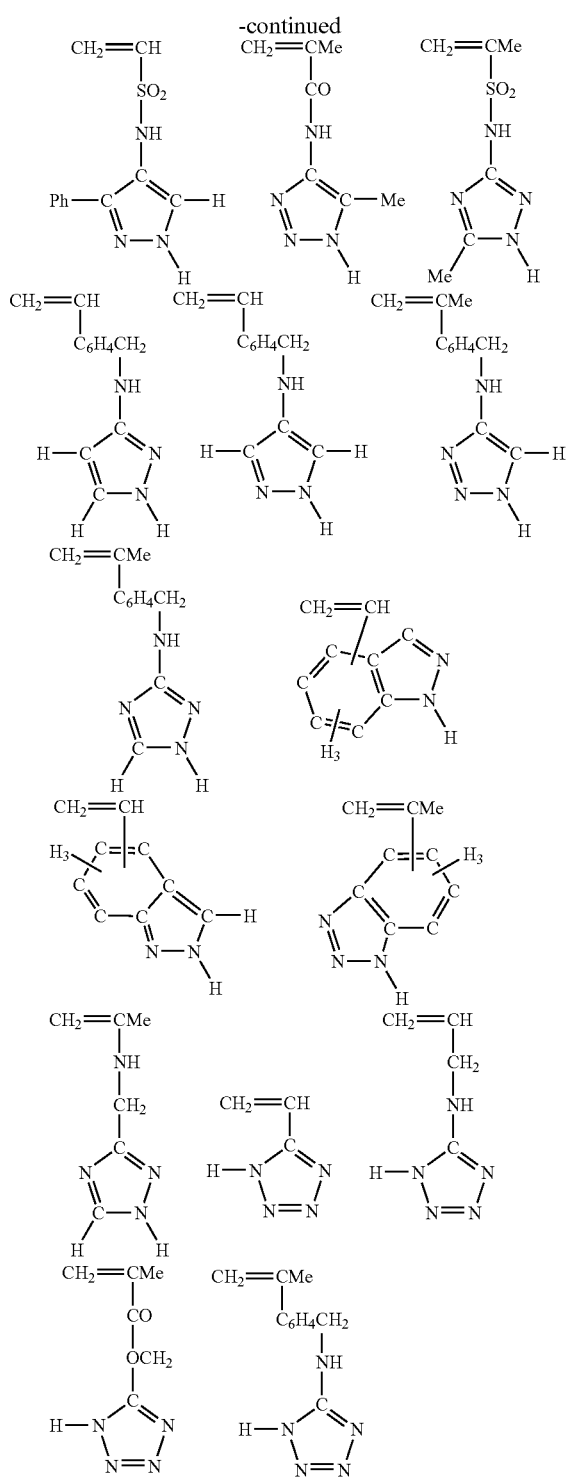
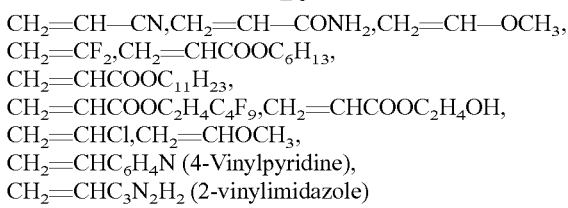
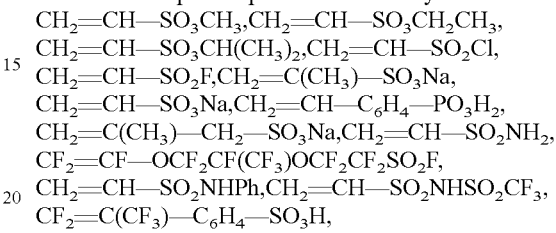

The followings are embodiments of monomers having other structure capable of copolymerizing with the vinyl monomers corresponding to repeating units as set forth in chemical formulas 1 to 5. But this description should not be construed as limited to the embodiments set forth herein.

The following are embodiments of monomers having a general vinyl group.

$CH_2=CH-Ph, CH_2=CH-COOH, CF_2=CF_2$,
$CH_2=C(CH_3)COOH, CH_2=CH-C(CH_3)=CH_2$,
$CH_2=CH-CN, CH_2=CH-CONH_2, CH_2=CH-OCH_3$,
$CH_2=CF_2, CH_2=CHCOOC_6H_{13}$,
$CH_2=CHCOOC_{11}H_{23}$,
$CH_2=CHCOOC_2H_4C_4F_9, CH_2=CHCOOC_2H_4OH$,
$CH_2=CHCl, CH_2=CHOCH_3$,
$CH_2=CHC_6H_4N$ (4-Vinylpyridine),
$CH_2=CHC_3N_2H_2$ (2-vinylimidazole)

Among the general monomers, followings are specific embodiments of monomers having an acidic group or precursor monomers thereof. The monomers having the acidic group are preferable in term of an improved solubility to the solvent and improved proton conductivity.

$CH_2=CH-SO_3CH_3, CH_2=CH-SO_3CH_2CH_3$,
$CH_2=CH-SO_3CH(CH_3)_2, CH_2=CH-SO_2Cl$,
$CH_2=CH-SO_2F, CH_2=C(CH_3)-SO_3Na$,
$CH_2=CH-SO_3Na, CH_2=CH-C_6H_4-PO_3H_2$,
$CH_2=C(CH_3)-CH_2-SO_3Na, CH_2=CH-SO_2NH_2$,
$CF_2=CF-OCF_2CF(CF_3)OCF_2CF_2SO_2F$,
$CH_2=CH-SO_2NHPh, CH_2=CH-SO_2NHSO_2CF_3$,
$CF_2=C(CF_3)-C_6H_4-SO_3H$,

The examples of solvent when polymerizing include hydrocarbon solvent, ether solvent, harogen solvent, alcohol solvent, amido solvent, ester solvent and the like. Specifically, the examples include toluene, tetrahydrofuran, dimethoxyethane, N,N-dimethylformamide, N, N-dimethylacetamido, 1,4-Dioxane, ethylacetate, anisole, methanol, ethanol, chloroform, methylene chloride and the like. But this description should not be construed as limited to the embodiments set forth herein.

The methods for polymerizing the vinyl monomers may include radical polymerization, cationic polymerization, anionic polymerization and the like. Among them, the radical polymerization is the most straightforward.

As mentioned above, it is possible to synthesize the polymers by combining the monomers with a radical initiator (a catalyst for generating radicals by heat or light) and radically polymerizing them by heat or light.

The radical initiator used when radical polymerizing include organic peroxide, inorganic peroxide, azobis compound, diazo compound, azido compound, thiram compound, metal acetylacetonato, α-sulfonyloxy-ketones, benzoinalkyether, nitroxide compound and the like.

More specifically, the embodiments of the radical initiator include ammonium persulfate, t-butylhydro peroxide, Di-t-butyl peroxide, azobisisobutyronitrile, cumenehydroperoxide, thiuram disulfide, thiuram monosulfide, 1-acetoxy-2-methylpyridinium picrate, benzoinalkylether and the like. But this description should not be construed as limited to the embodiments set forth herein.

Crosslinking agents may be used when polymerizing vinyl monomers. The doping rate of the agent should be at most 30 mol % to the vinyl monomers, because more than that doping rate makes the membrane hard and brittle.

Followings are embodiments of the crosslinking agent. But this description should not be construed as limited to the embodiments set forth herein.

TypeA (having more than or equal to 2 vinyl groups)
$CH_2=C(CH_3)-COO(CH_2CH_2CH_2)-OOC(CH_3)=CH_2$,
$CH_2=C(CH_3)-COO(CH_2CH_2)-OOC(CH_3)=CH_2$,
$CH_2=CH-C_6H_4-CH=CH_2$ TypeB (having vinyl group and -alkoxylsilyl group)
$CH_2=CH-Si(OCH_3)_3, CH_2=CH-Si(OCH_2CH_3)_3$,
$CH_2=CH-Ph-Si(OCH_3)_3, CH_2=CHCH_2-Si(OCH_3)_3$,
$CH_2=CH-CONHCH_2CH_2CH_2Si(OCH_2CH_3)_3$ TypeC
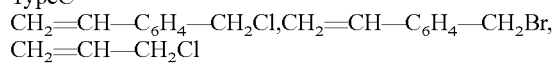

The type A are useful for a process being performed continuously from polymerizing to finally making the membrane, because the type A tends to gel. The type B has a characteristic of gelling by adding water to polymers. The type C has a characteristic of making corsslinkage by reacting with nitrogen of five-membered heterocyclic rings of the monomers. These characteristics make it possible to control the membrane to be made.

The crosslinking agents the type B and C as mentioned above accompany the crosslinkage. Especially, the type B promotes the crosslinkage by adding water.

In addition to doping the crosslinking agents when polymerizing, there are other methods for making the crosslinkage of the monomers corresponding to the repeating units as set forth in chemical formulas 1 to 5. The other method for crosslinking is based on substituting nitrogen of five-membered heterocyclic rings of the chemical formulas (1) to (5) with halogen atom of alkyl halide group.

The crosslinking agents may have molecules of at least 2 alkyl halide groups among molecules. Specifically, the embodiments of the crossliking agents include tetra(brommethy)benzene, 1,3, 5-tri(brommethy)benzene, 1-4 di(chloromethyl)benzene and the like. But this description should not be construed as limited to the embodiments set forth herein.

Next, the electrolyte membrane comprising the proton conductive polymer will be described hereinafter.

The electrolyte membrane may comprise a membrane being made by filming polymer components comprising the proton conductive polymer or by filling the polymer constituents into openings of a porous body. The membrane being made by filling the polymer constituents into a porous body is more preferable in term of higher strength of the electrolyte membrane. Embodiments of the porous body include bodies made of polyethylene, polypropylene, polyimide and the like. But this description should not be construed as limited to the embodiments set forth herein.

The polymer constituents comprising the proton conductive polymer may be either the proton conductive polymer itself or a compound of the proton conductive polymer and acid. By using the compound, the five-membered heterocyclic rings of side chain portion of chemical formulas 1 to 5 can hydrogen-couple with the proton and makes network. This is believed to lead to that "Grotthuss" mechanism works well. The embodiments of the acid include an organic acid, an inorganic acid, an inorganic solid acid and polymer having acid group.

The embodiments of the organic acid include methanesulfonic acid, trifluorosulfonic acid, bis(trifluorosulfonyl)imide, phenylsulfonic acid, perfluorooctanesulfonic acid and the like. But this description should not be construed as limited to the embodiments set forth herein. The specific organic acid described above have an advantage of improved proton conductivity.

The embodiments of the inorganic acid include sulfuric acid, phosphoric acid, nitric acid, hydrochloride and the like. But this description should not be construed as limited to the embodiments set forth herein. The specific inorganic acid described above have an advantage of improved proton conductivity. The embodiments of the inorganic solid acid include tungstic acid, $SiO_2$—$Al_2O_3$, phosphotungstic acid, phosphomolybdate, $TiO_2$—$WO_3$, and the like. The embodiments of the polymer having the acid group preferably include polymers having phosphoric acid group or sulfonic acid group in term of keeping the ion conductivity improved. Specifically, the embodiments of the polymer having the acid group include e.g. Nafion (registered trademark), perfluorosulfonic acid polymer, polystylene-styrenesulfonic acid copolymer, polystyrene-styrenephosphonic acid copolymer, polyisoprene-vinylsulfonic acid copolymer and the like. But this description should not be construed as limited to the embodiments set forth herein.

A general chemical formula of "Nafion" (registered trademark) is as follows:

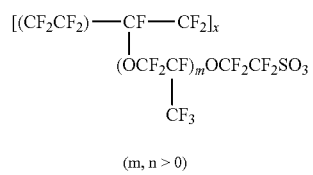

(m, n > 0)

Now, the method for making the particular electrolyte membrane will be described hereinafter. The particular electrolyte membrane is a membrane made by filming the polymer constituents, not by filling the polymer constituent into the openings of the porous body. The polymer constituent is the proton conductive polymer itself, but not the compound comprising the proton conductive polymer and acid. The method for making the particular electrolyte membrane includes steps for dissolving the proton conductive polymer into solvent, for applying the solution on a film under the control of concentration and viscosity of the solution and for evaporating the solvent or for evaporating the solvent after pouring the solvent into Petri dish. After that, the membrane of proton conductive polymer is peeled away from the film or the Petri dish. The evaporating step may be performed under elevated temperature for more rapid evaporation of the solvent. Furthermore, the peeling step may be performed with the film or the Petri dish being dipped in the solvent.

On the other hand, the method for making another electrolyte membrane will be described hereinafter. The electrolyte membrane is a membrane made by filming the polymer constituents, but not by filling the polymer constituents into the openings of the porous body. The polymer constituent is the compound comprising the proton conductive polymer and acid.

The method for another electrolyte membrane is as follows: The membrane of the proton conductive polymer is dipped in solution containing e.g. inorganic acid or organic acid, leading to the membrane filled with the acid solution. Then the membrane is rinsed with water and dried. Finally the membrane of interest is obtained. Alternatively, after the proton conductive polymer is dissolved in the solvent, and then into which acid is added and the solution of interest is obtained. The solution is applied on a film and then dried, or the solution is poured into the Petri dish and then dried. After that, the membrane of interest is peeled away from the film or the Petri dish.

In case of that e.g. inorganic solid acid, acid being hard to dissolve in polymer solution is used, the solution is prepared, containing polymer solvent and the acid being highly dispersed therein. After that, the membrane of interest is obtained according to above-mentioned method.

In case of the compound is used containing the proton conductive polymer and polymer having acidic group, the proton conductive polymer is dissolved in the solvent. The solution is applied on a film, under control of concentration and viscosity of the solution and solvent is evaporated. Alternatively, the solution is poured into the Petri dish and then solvent is evaporated. After that, the membrane of the proton conductive polymer is peeled away from the film or Petri dish. The step for making the membrane is performed under elevated temperature for more rapid evaporation of the solvent. Furthermore, the peeling step may be performed with the film or the Petri dish being dipped in the solvent. The membrane of interest may be obtained according to one of the above-mentioned methods.

Next, the method for making further another electrolyte membrane will be described hereinafter. The electrolyte membrane is a membrane made by filling the polymer constituent into the openings of the porous body. The polymer constituent is the proton conductive polymer itself, but not the compound comprising the proton conductive polymer and acid. Solution of polymer constituent is prepared and filled into a porous film. While the solvent is gradually evaporated, the porous film is thermo-pressed under the condition that the porous film still contains small volume of water.

In case of the proton conductive polymer containing the crosslinking agent type A being used for the electrolyte membrane, the solution contains at least monomer, the crosslinking agent type A and a radical initiator, furthermore general vinyl monomer in case. The solution is filled in the porous film. The filled porous film is held between two peelable polymer sheets with free from monomer dropping from the porous film and hot-pressed. The crosslinkage and polymerization of the porous film are performed simultaneously using hot-pressing. It is preferable to put rubber sheets over and under the polymer sheets when hot-pressing. The hot-pressing temperature is preferably at most 200 degree, depending upon the radical initiator and the monomer used. The porous film may be further heated, after pressing, if necessary.

Alternatively, the method for making the electrolyte membrane that the proton conductive polymer being filled in the porous body comprises steps for filling monomer solution into the porous body, for irradiating it with ionized radiation e.g. plasma, and for graft-polymerizing monomer with radicals produced. In case of that electrolyte membrane containing the porous body filled with polymer constituents and the polymer constituents is the compound comprising the proton conductive polymer and acid, the above-mentioned method may be applied, provided that the polymer constituent is changed.

In addition to being used only the membrane having the proton conductive polymer, the electrolyte membrane preferably may be a laminated structure having alternatively the film of proton conductive polymer and a film having other proton conductive polymer e.g. polymer containing perfluorocarbonsulfonic acid, e.g. "Nafion"(registered trademark). The fuel cell having layered or laminated structure membrane can decrease degree of the crossover of liquid fuel e.g. methanol, more than the single membrane of the proton conductive polymer, e.g. "Nafion" (registered trademark).

A method for making the layered or laminated structure includes preparing the proton conductive polymer solution and dip-coating, spin-coating, spray-coating the solution.

Next, the proton exchangemembrane fuel cell having the electrolyte membrane of proton conductive polymer will be described hereinafter. The electrolyte membrane having proton conductive polymer may be used together with a hydrogen-air fuel cell or a direct alcohol-air (oxygen) fuel cell. In addition to that, the inventive electrolyte membrane may be applicable to the direct methanol fuel cell, because of lowered methanol permeability. The direct methanol fuel cell will be described in detail hereinafter.

Referring to FIG. 3, the embodiment of a fuel conveying type direct methanol fuel cell will be described hereinafter. FIG. 3 shows a schematic view of a unit cell of the fuel conveying type direct methanol fuel cell. Referring FIG. 3, An electromotive section 4 includes a fuel electrode (anode) 2, an oxidizing agent electrode (cathode) 3 and a electrolyte membrane 1 being held between the electrodes 2, 3.

The unit cell comprises separators (electron conductive plates) 5, 6 and the electromotive section 4 being held between the separators 5, 6. The separators 5, 6 have grooves (channels) for flowing the fuel and the oxidizing agent to the fuel electrode 2 and the oxidizing agent electrode 3 respectively, as well as for conducting electron. A liquid fuel (methanol) is supplied to a fuel supply pass formed by the separator 5 and the fuel electrode 2 from a liquid fuel input 7 communicating with the fuel supply pass. A liquid fuel having been not consumed at the fuel electrode 2 is output from a liquid fuel output 8. Air is supplied to a gas supply pass formed by the separator 6 and the oxidizing agent electrode 3 from a gas introduction inlet 9 communicating with the gas supply pass. Air having been not consumed at the oxidizing agent electrode 3 is output from a gas outlet 10.

On the other hand, referring to FIG. 4, an embodiment of a fuel permeating type direct methanol fuel cell will be described hereinafter. FIG. 4 shows a sectional view of a unit cell of the fuel permeating type direct methanol fuel cell. A electromotive section 14 comprises a fuel electrode (anode) 12, an oxidizing agent electrode (cathode) 13 and an electrolyte membrane 11 being held between the electrodes 12 and 13.

It is to be noted that the fuel electrode 12 and the oxidizing agent electrode 13 are preferably made of an electron conductive porous body for flowing the fuel, the oxidizing agent as well as electron.

The unit cell further comprises a fuel evaporating section 16 and a fuel permeating section 15 being stacked on the fuel electrode 12 with this order from side of the fuel electrode 12. The fuel permeating section 15 provides the liquid fuel from external and retains it therein. The fuel evaporating section 16 evaporates the liquid fuel retained in the fuel permeating section 15 and guides the evaporated fuel to a fuel electrode 12. An insulating separator 17 is stacked on an outside of a permeating section 15 from view point of an electrolyte membrane 11 for separating other unit cell. On the other hand, on the outside of the oxidizing agent electrode 13 from view point of the electrolyte membrane 11 is stacked a separator 18. Oxidizing agent gas supplying grooves are formed as continuous grooves on that surface of the separator 18 which faces the oxidizing agent electrode 13. Air is supplied to the gas flow pass formed by the separator 18 and the oxidizing agent electrode 13 from a gas introduction inlet 19 communicating with the pass. The air being unconsumed is output from a gas outlet 20.

The liquid fuel introduced to the fuel permeating section 15 from external is evaporated at the fuel evaporating section 16 and then supplied to the fuel electrode 12. It is to be noted that, in case of that the fuel permeating section 15 is formed of a material producing capillary action, it is possible to supply the liquid fuel to the fuel permeating section 15 by capillary action without using auxiliary equipment. For capillary action to be effective, it is necessary for the fuel cell to be constructed such that the liquid fuel introduced into the liquid fuel introducing pass 10 is directly contact with one end of the fuel permeating section 15.

The separator 17, 18, the fuel permeating section 6 and the fuel evaporating section 7 are made of electron conductive material since they perform as collecting plates for conducting electron produced.

Referring the fuel cell shown in the FIGS. 3 and 4, the electromotive sections 4 and 14 comprise a membrane electrode assembly (MEA) being made by that the electrolyte membrane held between the fuel electrode (anode) and the oxidizing agent (cathode), the stack is compression-bonded by hot pressing. The temperature of above-mentioned process is preferably about a softening point of the electrolyte membrane, but not limited to the temperature. It is possible to make an anode catalyst layer on one side and a cathode catalyst layer on the other side of the electrolyte membrane by applying the anode and cathode catalyst composite slurries on one and the other sides of the electrolyte membrane respectively and drying them. A carbon paper may be attached to the both catalyst layers for making collecting plates.

With the fuel cell as shown in FIGS. 3 and 4, a stratum-like, an island-like or granular catalyst layer may be formed between the fuel electrodes 2, 12 or the oxidizing agent electrode 3, 13 and the electrolyte membrane 1, 11, if necessary. The invention should not be construed to be limited to whether the catalyst layer exists or not.

It is to be noted that the fuel electrode 2, 12 or the oxidizing agent electrode 3, 13 themselves may be the catalyst electrodes. The catalyst electrode may include a catalyst composite comprising the proton conductive polymer and catalyst, a single layer consisting of catalyst only or a laminated structure having the catalyst layer on supporting member e.g. electron conductive paper or cloth.

For supplying liquid fuel from the fuel storing tank (not shown) to the fuel permeating portion 15, the liquid fuel housed in the fuel storing tank is subject to, for example, free fall so as to be introduced into the fuel permeating portion 15. This method permits introducing the liquid fuel into the fuel cell without fail, though there is a structural limitation in that the fuel storing tank may be positioned higher than the upper surface of the stacked fuel cell. Other method includes that the liquid fuel is sucked from the fuel storing tank by the capillary action of the fuel permeating portion.

Furthermore, in case of that liquid fuel supplied to the fuel permeating portion 15 by capillary action, the fuel permeating section 15 may have any structures, provided that the liquid fuel permeates the fuel permeating portion 15 by the capillary action. The fuel permeating section 15 may be a porous body made of granular or filler, unwoven cloth made by paper-making method etc., a woven cloth made of fibers or gap or slit formed between plates made of glass or plastic.

Next, the catalyst composite comprising the proton conductive polymer and catalyst will be described hereinafter. The proton conductive polymer contained in the catalyst composite may be the proton conductive polymer only or a compound comprising the proton conductive polymer and acid.

The catalyst composite comprising the proton conductive polymer and catalyst is used for various kinds of applications depending upon the selected catalyst, because the catalyst composite contains the catalyst and is proton conductive.

For example, some catalyst is selected for promoting electrode reaction of the fuel cell, the catalyst may be preferably used for anode or cathode electrodes. The catalyst composite comprising appropriate catalyst is used for a sensor, an electrode for refining hydrogen, an electrode for oxidizing or reducing (chemically reacting) chemical substances.

In case of the catalyst composite to be used for an anode or a cathode electrode, the catalyst may be preferably platinum or an alloy thereof for promoting electrode reaction.

The catalyst composite being used for anode or cathode electrodes is made as follows. A solvent is added to the proton conductive polymer and anode catalyst PtRu bearing carbon or cathode catalyst Pt carbon. The solution is dispersed by disperser and results in a catalyst composite slurry to be applied. The process may comprise complexing with acid. The complexing made by adding acid to the slurry while dispersing or filling acid after making the electrode. The slurry is applied on a carbon paper being hydrophibicly processed and dried, resulting in an anode or a cathode electrodes.

In case of the catalyst composite made by the above-mentioned method is used as an anode and a cathode electrodes of the fuel cell, the ratio of the proton conductive polymer or a compound comprising the proton conductive polymer and acid to the catalyst ranges preferably from 10 to 1000 weight portion of the polymer or the compound relative to the catalyst of 100 weight portion. In case of less than 10 weight portion, proton conductivity is lowered and in case of more than 1000 weight portion, electric resistance is too high. This leads to poor fuel cell performance.

EMBODIMENTS

Embodiment 1

3-acrylamidetetrazole of 2.00 g and azobisisobutyronitrile of 0.0293 g were dissolved in DMF(N,N-dimethylformamide) of 20 ml. Then, Ar was blown into the mixture to replace gas, and the mixture was being reacted under an Ar atmosphere at 65 degrees for 15 hours. After concentrating the reacted mixture polymer was obtained by dropping the reacted mixture into methanol and dehydrating filtered precipitate. MW=16000. The structural chemical formula of the polymer is as follows.

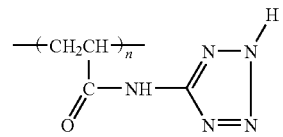

Embodiment 2

3—acrylamidotetrazole of 2.00 g, styrene of 1.50 g and azobisisobutyronitrile of 0.0293 g were dissolved in DMF of 20 ml, and then, Ar was blown into the mixture to replace gas, and the mixture was being reacted under an Ar atmosphere at 65 degrees for 15 hours. After concentrating the reacted mixture, polymer was obtained by dropping the reacted mixture into methanol and dehydrating filtered precipitate MW=26000. The structural chemical formula of the polymer is as follows. In this case, a feeding ratio was m:n=1:1.

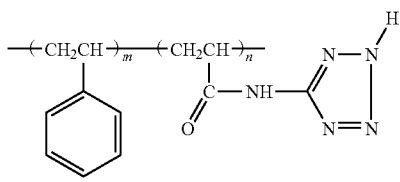

Embodiment 3

3-acrylamidotetrazole of 2.00 g, acrylonitrile of 0.763 g and azobisisobutyronitrile of 0.0310 g were dissolved in DMF of 20 ml, and then, Ar was blown into the mixture to replace gas, and the mixture was being reacted under an Ar atmosphere at 65 degrees for 15 hours. After concentrating the reacted mixture, polymer was obtained by dropping the reacted mixture into methanol and dehydrating filteredprecipitate. MW=31000. The structural chemical formula of the polymer is as follows. In this case, a feeding ratio was m:n=1:1.

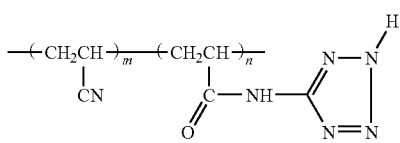

Embodiment 4

3-acrylamidotetrazole of 2.00 g, undecyl methacrylate of 1.15 g and azobisisobutyronitrile of 0.0303 g were dissolved in DMF of 20 ml, and then, Ar was blown into the mixture to replace gas, and the mixture was being reacted under an Ar atmosphere at 65 degrees for 15 hours. After concentrating the reacted mixture, polymer was obtained by dropping the reacted mixture into methanol and dehydrating filteredprecipitate. MW=45000. The structural chemical formula of the polymer is as follows. In this case, a feeding ratio was m:n=1:3.

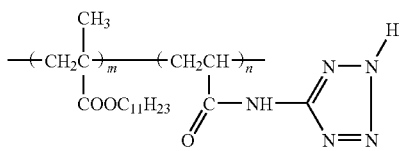

Next, a film was obtained by pouring the obtained polymer as an about 10 percent solution dissolved by DMF into a petri dish and leaving the obtained polymer in a dryer at 50 degrees for one day and night.

Embodiment 5

3-acryloamido-1,2,4-trizole of 2.00 g and azobisisobutyronitrile of 0.0309 g were dissolved in DMF of 20 ml, and then, Ar was blown into the mixture to replace gas, and the mixture was being reacted under an Ar atmosphere at 65 degrees for 15 hours. After concentrating the reacted mixture, polymer was obtained by dropping the reacted mixture into methanol and dehydrating filteredprecipitate. MW=26000. The structural chemical formula of the polymer is as follows.

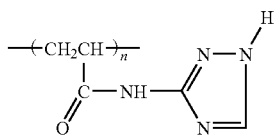

Embodiment 6

3-acrylamido-1,2,4-trizole of 2.00 g, undecyl methacrylate of 3.45 g and azobisisobutyronitrile of 0.0299 were dissolved in DMF of 20 ml, and then, Ar was blown into the mixture to replace gas, and the mixture was being reacted under an Ar atmosphere at 65 degrees for 15 hours. After concentrating the reacted mixture, polymer was obtained by dropping the reacted mixture into methanol and dehydrating filteredprecipitate. MW=35000. The structural chemical formula of the polymer is as follows. In this case, a feeding ratio was m:n=1:1.

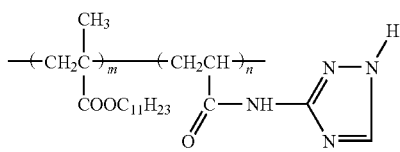

Embodiment 7

3-vinylsulfonamidetetrazole of 2.00 g and azobisisobutyronitrile of 0.0291 g were dissolved in DMF of 20 ml, and then, Ar was blown into the mixture to replace gas, and the mixture was being reacted under an Ar atmosphere at 65 degrees for 15 hours. After concentrating the reacted mixture, polymer was obtained by dropping the reacted mixture into methanol and dehydrating filteredprecipitate. MW=26500. The structural chemical formula of the polymer is as follows.

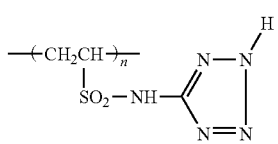

Embodiment 8

3-Vinylsulfonamidetetrazole of 2.00 g, undecyl methacrylate of 1.00 g and azobisisobutyronitrile of 0.0279 g were dissolved in DMF of 20 ml, and then, Ar was blown into the mixture to replace gas, and the mixture was being reacted under an Ar atmosphere at 65 degrees for 15 hours. After concentrating the reacted mixture, polymer was obtained by dropping the reacted mixture into methanol and dehydrating filteredprecipitate. MW=28000. The structural chemical formula of the polymer is as follows. In this case, a feeding ratio was m:n=1:3.

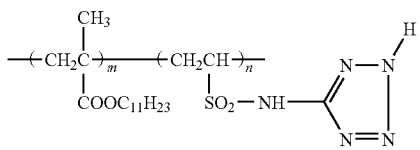

Embodiment 9

3-vinyltetrazole of 2.00 g and azobisisobutyronitrile of 0.0301 g were dissolved in DMF of 20 ml, and then, Ar was blown into the mixture to replace gas, and the mixture was being reacted under an Ar atmosphere at 65 degrees for 15 hours. After concentrating the reacted mixture, polymer was obtained by dropping the reacted mixture into methanol and dehydrating filtered sediment. MW=18000. The structural chemical formula of the polymer is as follows.

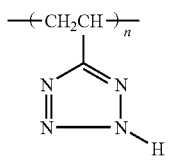

Next, a film was obtained by pouring the obtained polymer as an about 10 percent solution dissolved by DMF into a petri dish and leaving the obtained polymer in a dryer at 50 degrees for one day and night.

Embodiment 10

3-vinylsulfonamide-1,2,4-triazole of 2.00 g, undecyl methacrylate of 1.00 g and azobisisobutyronitrile of 0.0307 g were dissolved in DMF of 20 ml, and then, Ar was blown into the mixture to replace gas, and the mixture was being reacted under an Ar atmosphere at 65 degrees for 15 hours. After concentrating the reacted mixture, polymer was obtained by dropping the reacted mixture into methanol and dehydrating filtered sediment. MW=29000. The structural chemical formula of the polymer is as follows. In this case, a feeding ratio was m:n=1:3.

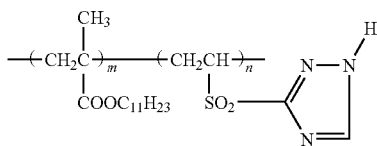

Embodiment 11

3-vinyl-1,2,4-trizole of 2.00 g and azobisisobutyronitrile of 0.0321 g were dissolved in DMF of 20 ml, and then, Ar was blown into the mixture to replace gas, and the mixture was being reacted under an Ar atmosphere at 65 degrees for 15 hours. After concentrating the reacted mixture, polymer was obtained by dropping the reacted mixture into methanol and dehydrating filteredprecipitate. MW=20000. The structural chemical formula of the polymer is as follows.

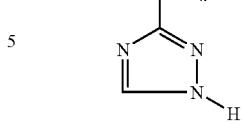

Embodiment 12

3-acrylamide-1H-pylazole of 2.00 g, undecyl methacrylate of 1.15 g and azobisisobutyronitrile of 0.0299 g were dissolved in DMF of 20 ml, and then, Ar was blown into the mixture to replace gas, and the mixture was being reacted under an Ar atmosphere at 65 degrees for 15 hours. After concentrating the reacted mixture, polymer was obtained by dropping the reacted mixture into methanol and dehydrating filteredprecipitate. MW=34000. The structural chemical formula of the polymer is as follows. In this case, a feeding ratio was m:n=1:3.

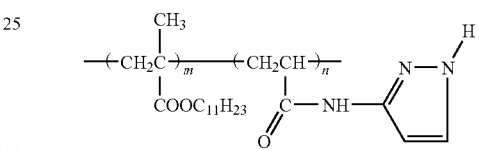

Embodiment 13

3-acrylamide-tetrazole of 1.50 g, sodium vinylsulfonate of 0.300 g, bismethacrylhexamethylene of 0.2 g and azobisisobutyronitrile of 0.0499 g were dissolved in DMF of 10 ml, then, Ar was blown into the mixture to replace gas. The mixture was impregnated or filled into a porous (about 60 percent porosity) polyethylene film and then the film was held between cellophane films to put gas out. After that, the laminated films were held by two silicon rubber sheets, being pressed under stress of about 10 Kg/Cm$^2$ at 120 degrees for 10 minutes to react it, and then is put in the water, and the cellophane films were peeled away to make a film. The porous polyethylene film was soaked in a 1M sulfuric acid solution, rinsed in water to make a proton conductive membrane. The structural chemical formula is as follows. In this case, a feeding ratio was m:n=1:5.4.

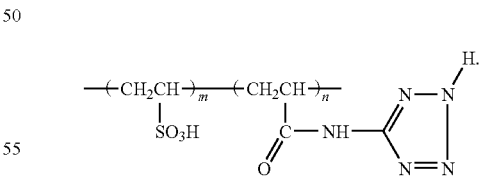

Embodiment 14

Measurement of Methanol Permeability

Solutions that polymers of 0.5 g obtained by the embodiments 1-13 were dissolved in DMA of 100 ml were made. Nafion 117 membranes were soaked in the solutions for 5 minutes, and then, dried to make composite electrolyte membranes.

The permeability of methanol was measured as follows. The composite electrolyte membranes were inserted between cells having an area of 10 cm² of the proton conductive polymer membrane. A 10 percent methanol solution was poured into one cell and pure water was poured into the other cell. After a predetermined time period at room temperature, the concentration of methanol of the cell containing pure water was measured by gas chromatography to measure the permeability of methanol. The membranes, on the other hand, were being soaked in water for 16 hours, and then, water was drained. Then the permeability of methanol was measured. The permeability of methanol is listed in the following table that relatively represents Nafion (registered trademark) as 1. Further, the electrical resistances of the membranes were measured by using two square cells having an area of 10 cm². The membrane was inserted between the cell and the other cell, and platinum electrodes were attached to outsides of the cells. The electrical resistances were measured between the cells.

TABLE 1

| Composite Membrane with Nafion117 | Relative Methanol Permeability | Relative Membrane Conductivity |
|---|---|---|
| (Composite with Embodiment 1) | 0.62 | 0.92 |
| (Composite with Embodiment 2) | 0.61 | 0.9 |
| (Composite with Embodiment 3) | 0.65 | 1.0 |
| (Composite with Embodiment 4) | 0.60 | 0.9 |
| (Composite with Embodiment 5) | 0.56 | 0.89 |
| (Composite with Embodiment 6) | 0.56 | 0.9 |
| (Composite with Embodiment 7) | 0.67 | 1.0 |
| (Composite with Embodiment 8) | 0.45 | 0.9 |
| (Composite with Embodiment 9) | 0.68 | 0.95 |
| (Composite with Embodiment 10) | 0.60 | 0.87 |
| (Composite with Embodiment 11) | 0.71 | 0.93 |
| (Composite with Embodiment 12) | 0.68 | 0.96 |
| (Embodiment 13) | 0.52 | 0.78 |
| (Comparative example 1) Nafion | 1.0 | 1.0 |

As a result, it became apparent that the conductivity was not reduced significantly, however, the methanol permeability of the composite membrane was reduced significantly.

Embodiment 15

A cathode electrode (catalytic amount: Pt 4 mg/cm², available from E-tek Co.) and an anode electrode (catalytic amount: Pt—Ru 4 mg/cm²) in which a 5 percent Nafion (registered trademark) solution filled were prepared. A composite membrane made by the polymer of the embodiment 3 and a Nafion (registered trademark) 117 membrane was inserted between the two electrode as solid membrane of a proton conductivity polymer, and was pressure-bonded under stress of 100 kg/cm² at 125 degrees for 5 minutes to make a membrane electrode assembly (MEA). The membrane electrode assembly (MEA) was inserted between a carbon-based cell with a fuel input and a carbon-based cell with an air inlet using Teflon (registered trademark) film as a seal material. Then, a 10 M methanol solution was input as fuel, the air was supplied, outsides of the cells were heated to 40 degrees, a current of 10 mA/cm² was extracted. Then, the time stability of the fuel cell performance was observed, resulting in that an output was stable even after several hours were passed.

COMPARATIVE EXAMPLE 2

A cathode electrode (catalytic amount: Pt 4 mg/cm², available from E-tek Co.) and an anode electrode (catalyst amount: Pt—Ru 4 mg/cm²) in which a 5 percent Nafion (registered trademark) solution filled were prepared. A Nafion (registered trademark) 117 membrane (available from Du Pont Inc.) was inserted between the two electrode and was pressure-bonded under stress of 100 kg/cm² at 125 degrees for 5 minutes to make a membrane electrode assembly (MEA). The membrane electrode assembly (MEA) was inserted between a carbon-based cell with a fuel input and a carbon-based cell with an air inlet using a Teflon (registered trademark) film as a seal material. Then, a 10 M methanol solution was input as fuel, the air was sent, outsides of the cells were heated to 40 degrees, a current of 10 mA/cm² was extracted. Then, the time stability of the fuel cell performance was observed, resulting in that an output could obtain for a few minutes only.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrolyte membrane for a fuel cell comprising a laminated structure of a proton conductive polymer and a perfluorocarbonsulfonic acid containing polymer membrane, wherein the proton conductive polymer comprises a polymer including at least one repeating unit selected from the following chemical formulas 1-5:

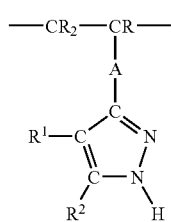

1

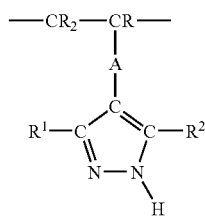

2

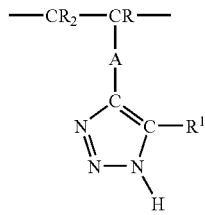

3

-continued

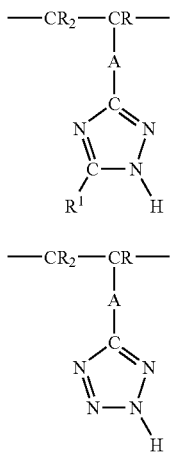

wherein
 A is a valence or a bivalent organic group,
 R is a hydrogen atom,
 $R^1$ is at least one selected from the group consisting of hydrogen atom, halogen atom, substituted or unsubstituted amino group, substituted or unsubstituted alkoxy group, and substituted or unsubstituted hydrocarbon group, and
 $R^2$ is at least one selected from the group consisting of hydrogen atom, halogen atom, substituted or unsubstituted amino group, substituted or unsubstituted alkoxy group, and substituted or unsubstituted hydrocarbon group,
 and wherein the proton conductive polymer film is different from the perfluorocarbonsulfonic acid containing polymer membrane.

2. An electrolyte membrane for a fuel cell comprising a composite of a proton conductive polymer and an acid, wherein the proton conductive polymer comprises a polymer including at least one repeating unit selected from the following chemical formulas 1-5:

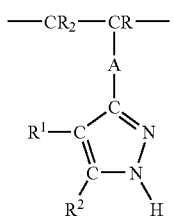

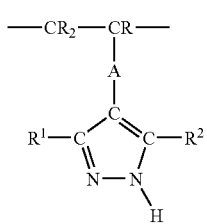

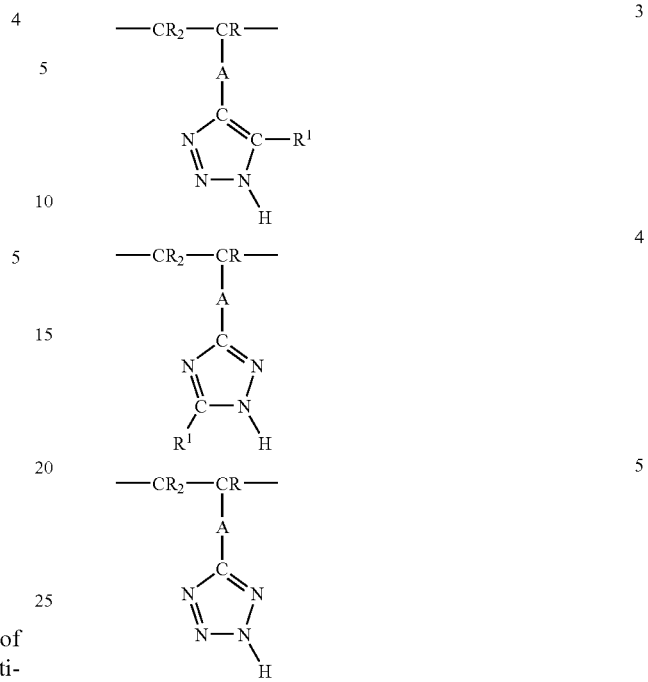

wherein
 A is a valence or a bivalent organic group,
 R is a hydrogen atom,
 $R^1$ is at least one selected from the group consisting of hydrogen atom, halogen atom, substituted or unsubstituted amino group, substituted or unsubstituted alkoxy group, and substituted or unsubstituted hydrocarbon group,
 $R^2$ is at least one selected from the group consisting of hydrogen atom, halogen atom, substituted or unsubstituted amino group, substituted or unsubstituted alkoxy group, and substituted or unsubstituted hydrocarbon group.

3. The electrolyte membrane for a fuel cell according to claim 2, wherein the membrane further comprises a porous body and the composite is filled in pores of the porous body.

4. The electrolyte membrane for a fuel cell according to claim 2, further comprising a perfluorocarbonsulfonic acid containing polymer membrane laminated on the membrane.

5. The electrolyte membrane for a fuel cell according to claim 2, wherein the acid includes at least one selected from the group consisting of an organic acid, an inorganic acid, an inorganic solid acid, an organic acid, and polymers having an acid group.

6. The electrolyte membrane for a fuel cell according to claim 5, wherein the polymers having an acid group includes at least one selected from the group consisting of a polymer containing perfluorosulfonic acid, polystylene-styrenesulfonic acid copolymer, polystyrene-styrenephosphonic acid copolymer, and polyisoprene-vinylsulfonic acid copolymer.

7. A catalyst composition comprising
 a catalyst, and
 a composite of the proton conductive polymer and an acid, wherein the proton conductive polymer comprises a polymer including at least one repeating unit selected from the following chemical formulas 1-5:

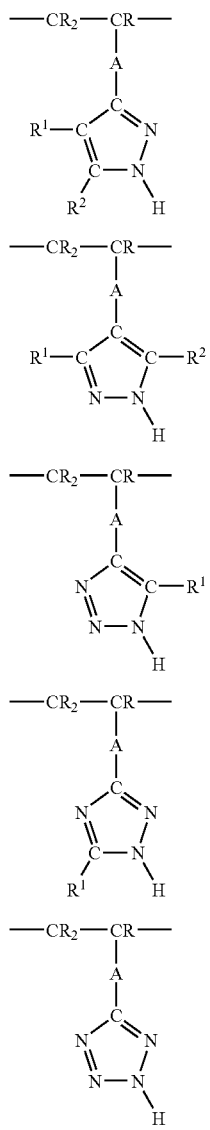

wherein
A is a valence or a bivalent organic group,
R is a hydrogen atom,
R¹ is at least one selected from the group consisting of hydrogen atom, halogen atom, substituted or unsubstituted amino group, substituted or unsubstituted alkoxy group, and substituted or unsubstituted hydrocarbon group,
R² is at least one selected from the group consisting of hydrogen atom, halogen atom, substituted or unsubstituted amino group, substituted or unsubstituted alkoxy group, and substituted or unsubstituted hydrocarbon group.

8. The catalyst composition according to claim 7, wherein the catalyst includes at least one of platinum or platinum-alloy.

9. A fuel cell comprising an anode, a cathode, and an electrolyte membrane held between the anode and the cathode, wherein the electrolyte membrane comprises a laminated structure of a proton conductive polymer and a perfluorocarbonsulfonic acid containing polymer membrane wherein the proton conductive polymer comprises a polymer including at least one repeating unit selected from the following chemical formulas 1-5:

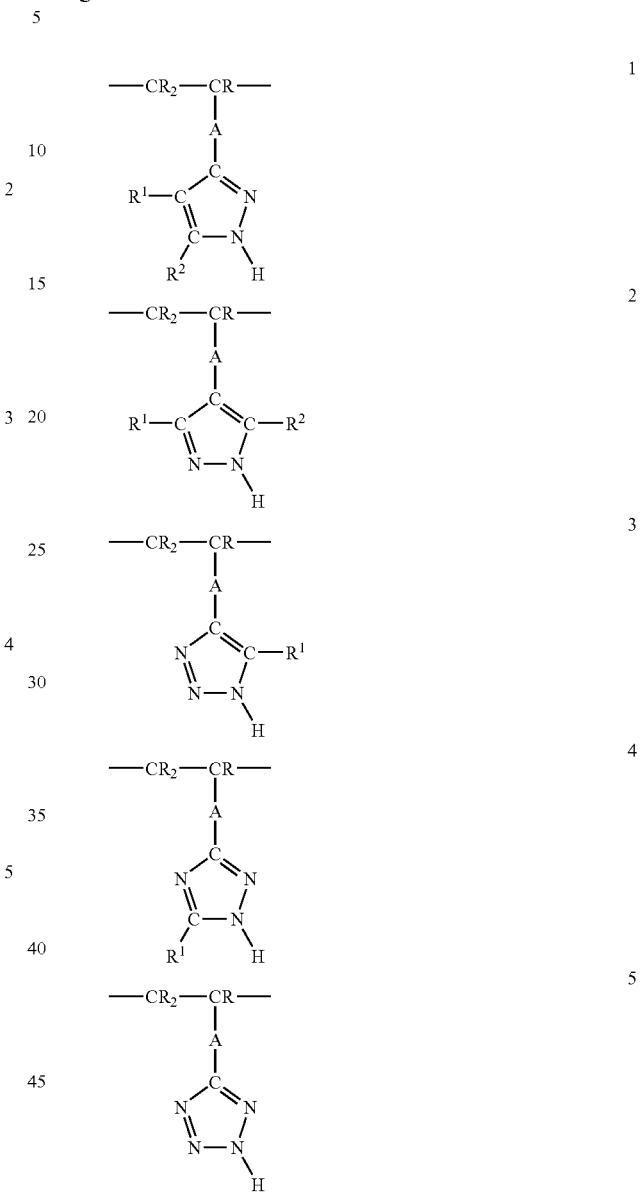

wherein
A is a valence or a bivalent organic group,
R is a hydrogen atom,
R¹ is at least one selected from the group consisting of hydrogen atom, halogen atom, substituted or unsubstituted amino group, substituted or unsubstituted alkoxy group, and substituted or unsubstituted hydrocarbon group, and
R² is at least one selected from the group consisting of hydrogen atom, halogen atom, substituted or unsubstituted amino group, substituted or unsubstituted alkoxy group, and substituted or unsubstituted hydrocarbon group,
and wherein the proton conductive polymer film is different from the perfluorocarbonsulfonic acid containing polymer membrane.

10. The fuel cell according to claim 9, further comprising liquid methanol supplied to the anode and oxygen supplied to the cathode.

11. A fuel cell comprising an anode, a cathode, and the electrolyte membrane for a fuel cell of claim 2, held between the anode and the cathode.

12. The fuel cell according to claim 11, further comprising liquid methanol supplied to the anode and oxygen supplied to the cathode.

13. A fuel cell comprising an anode, a cathode and an electrolyte membrane held between the anode and cathode, wherein at least one of the anode and cathode includes the catalyst composition of claim 7, and the catalyst of the catalyst composition promotes an electrode reaction.

14. The fuel cell according to claim 13, further comprising liquid methanol supplied to the anode and oxygen supplied to the cathode.

15. An electrolyte membrane for a fuel cell as claimed in claim 1, wherein the proton conductive polymer comprises a polymer including at least one repeating unit of chemical formula 1.

16. An electrolyte membrane for a fuel cell as claimed in claim 1, wherein the proton conductive polymer comprises a polymer including at least one repeating unit of chemical formula 2.

17. An electrolyte membrane for a fuel cell as claimed in claim 1, wherein the proton conductive polymer comprises a polymer including at least one repeating unit of chemical formula 3.

18. An electrolyte membrane for a fuel cell as claimed in claim 1, wherein the proton conductive polymer comprises a polymer including at least one repeating unit of chemical formula 4.

19. An electrolyte membrane for a fuel cell as claimed in claim 1, wherein the proton conductive polymer comprises a polymer including at least one repeating unit of chemical formula 5.

* * * * *